(12) United States Patent
Lynn et al.

(10) Patent No.: US 8,517,615 B1
(45) Date of Patent: Aug. 27, 2013

(54) MULTI-DIAMETER OPTICAL FIBER LINK FOR ALL OPTICS SYSTEM BACKPLANE SOLUTION

(75) Inventors: John Lynn, Easton, PA (US); Eric Lynn, Easton, PA (US)

(73) Assignee: Netgami System L.L.C., Morganville, NJ (US)

( * ) Notice: Subject to any disclaimer, the term of this patent is extended or adjusted under 35 U.S.C. 154(b) by 0 days.

(21) Appl. No.: 13/432,903

(22) Filed: Mar. 28, 2012

(51) Int. Cl.
*G02B 6/255* (2006.01)
*G02B 6/00* (2006.01)

(52) U.S. Cl.
USPC ............................................. 385/89; 385/147

(58) Field of Classification Search
USPC ............................................. 385/88–93, 147
See application file for complete search history.

(56) References Cited

U.S. PATENT DOCUMENTS

| | | | | |
|---|---|---|---|---|
| 5,155,785 A * | 10/1992 | Holland et al. | ................ | 385/89 |
| 6,233,376 B1 * | 5/2001 | Updegrove | ................ | 385/14 |
| 6,419,399 B1 * | 7/2002 | Loder et al. | ................ | 385/53 |
| 6,466,310 B2 * | 10/2002 | Nguyen et al. | ................ | 356/73.1 |
| 6,587,631 B2 * | 7/2003 | Paradiso et al. | ................ | 385/134 |
| 6,594,434 B1 * | 7/2003 | Davidson et al. | ................ | 385/135 |
| 7,364,366 B2 * | 4/2008 | Tourne | ................ | 385/69 |
| 2002/0106161 A1 * | 8/2002 | Kiani | ................ | 385/53 |
| 2006/0051015 A1 * | 3/2006 | Look | ................ | 385/24 |

* cited by examiner

*Primary Examiner* — Akm Enayet Ullah
(74) *Attorney, Agent, or Firm* — Birch, Stewart, Kolasch & Birch, LLP (57) ABSTRACT

A multi-diameter optical fiber link system includes a backplane, a plurality of backplane connectors fixed on the backplane, and a plurality of line card connectors inserted into a corresponding one of the backplane connectors. Each of the backplane connectors has a fiber holder holding optical fibers with a first diameter and a second diameter, and each of the line card connectors has a fiber holder holding optical fibers with a third diameter, such that one optical fiber with the first diameter is linked to one optical fiber with the second diameter, and one optical fiber with the second diameter is linked to one optical fiber with the third diameter, thereby providing bi-directional connection.

20 Claims, 8 Drawing Sheets

MULTI-DIAMETER OPTICAL FIBER LINK FOR ALL OPTICS SYSTEM BACKPLANE SOLUTION

CROSS-REFERENCE TO RELATED APPLICATIONS

The present application is related to application Ser. No. 13/067,037 filed on May 4, 2011, the entirety of which is incorporated herein by reference.

BACKGROUND OF THE INVENTION

1. Field of the Invention

The present invention relates to an optical fiber link, and more particularly to, a multi-diameter optical fiber link for all optical system backplane solutions that eliminate the electrical signal connection between line card modules of a system. The present invention is also as simple as the traditional electrical connector.

2. Background of the Invention

Figure 1:
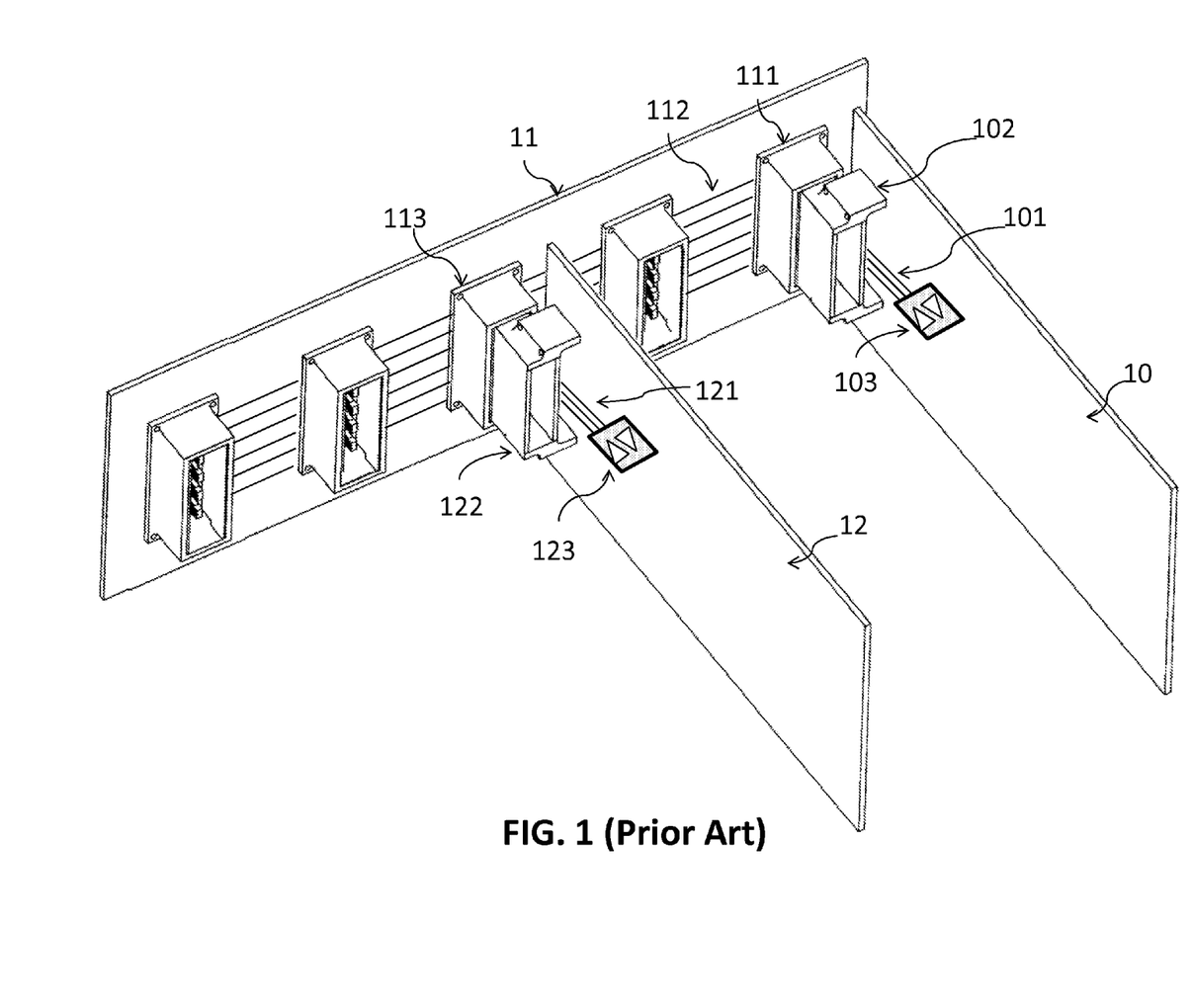
FIG. 1 illustrates a schematic drawing of a conventional electrical wiring backplane solution.

In a complicated system, a plurality of subsystems, function blocks, modules, and/or line card modules may be used, and signals are transmitted therebetween via electrical wiring. FIG. 1 is a schematic drawing of a conventional electrical wiring backplane solution. As shown in FIG. 1, the line card modules 10 and 12 communicate to each other through the Backplane 11, and the communication signals are carried by the electrical wires 101, 112 and 212. The electrical wires extends from the line card module 10 to the module 12 via the line card connector 102, the backplane connector 111, the backplane wiring 112, the backplane connector 113, the line card connector 122, and the electrical wire 121. The electrical signals are driven and received by the integrated circuits (IC) 103 and 123. As the communication data rate increases, it requires more wires and high speed signals to carry heavy data load. It also makes the wiring design more difficult for the backplane 11 and the line card module 10.

In general, one pair of differential electrical wires can carry a data rate up to 3 Giga bits per-second (Gbps). If the system requires communication rates above 100 Gbps, designing the layout of the electrical wires will become very difficult for the backplane and the line card module. It would require a printed circuit board with tens of layers of as the backplane to carry that kind of data rate. In addition, the increased data rate also causes the electromagnetic interference (EMI) problem for the whole system.

SUMMARY OF THE INVENTION

Accordingly, it is an object of the present invention to provide a solution to eliminate the EMI and simplify the backplane design for high data rate applications.

According to a first aspect of the present invention, a multi-diameter optical fiber link system, comprises: a backplane; a plurality of backplane connectors fixed on the backplane, each of the backplane connectors including: at least one backplane fiber holder having a first side and a second side opposite to the first side, each of the first side and the second side of the at least one backplane fiber holder holding at least one type-2 optical fiber; and a plurality of line card connectors, each of the line card connectors being inserted into a corresponding one of the backplane connectors, each of the line card connectors including: at least one line card fiber holder having a first side and a second side opposite to the first side, the first side of the at least one line card fiber holder holding at least one type-1 optical fiber, the second side of the at least one line card fiber holder holding at least one type-3 optical fiber, wherein the at least one type-1 optical fiber, the at least one type-2 optical fiber and the at least one type-3 optical fiber have mutually different diameters, and wherein the at least one line card fiber holder of one of the line card connectors is substantially aligned with the at least one backplane fiber holder of the corresponding one of the backplane connectors, such that one end of the at least one type-1 optical fiber held by the first side of the at least one line card fiber holder faces one end of the at least one type-2 optical fiber held by the first side of the at least one backplane fiber holder, thereby allowing optical signals to be transmitted from the at least one type-1 optical fiber to the at least one type-2 optical fiber held by the first side of the at least one backplane fiber holder, and one end of the at least one type-3 optical fiber held by the second side of the at least one line card fiber holder faces one end of the at least one type-3 optical fiber held by the second side of the at least one backplane fiber holder, thereby allowing optical signals to be transmitted from the at least one type-2 optical fiber held by the second side of the at least one backplane fiber holder to the at least one type-3 optical fiber.

According to a second aspect of the present invention, a multi-diameter optical fiber link system, comprises: a backplane; a plurality of backplane connectors fixed on the backplane, each of the backplane connectors including: at least one backplane fiber holder having a first side and a second side opposite to the first side, each of the first side and the second side of the at least one backplane fiber holder holding at least one type-2 optical fiber; and a plurality of line card connectors, each of the line card connectors being inserted into a corresponding one of the backplane connectors, each of the line card connectors including: at least one line card fiber holder having a first side and a second side opposite to the first side, the first side of the at least one line card fiber holder holding at least one type-1 optical fiber, the second side of the at least one line card fiber holder holding at least one type-3 optical fiber, wherein the diameter of the at least one type-1 optical fiber is smaller than the diameter of the at least one type-2 optical fiber, and the diameter of the at least one type-2 optical fiber is smaller than the diameter of the at least one type-3 optical fiber, and wherein the at least one line card fiber holder of one of the line card connectors is substantially aligned with the at least one backplane fiber holder of the corresponding one of the backplane connectors, such that an entire end surface of one end of the at least one type-1 optical fiber directly faces an area within an entire end surface of one end of the at least one type-2 optical fiber held by the first side of the at least one backplane fiber holder, thereby allowing optical signals to be transmitted from the at least one type-1 optical fiber to the at least one type-2 optical fiber held by the first side of the at least one backplane fiber holder, and an entire end surface of one end of the at least one type-2 optical fiber by the second side of the at least one backplane fiber holder directly faces an area within an entire end surface of one end of the at least one type-3 optical fiber, thereby allowing optical signals to be transmitted from the at least one type-2 optical fiber held by the second side of the at least one backplane fiber holder to the at least one type-3 optical fiber.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described in detail with reference to the accompanying drawings, wherein the same reference numerals will be used to identify the same or similar elements throughout the several views. It should be noted that the drawings should be viewed in the direction of orientation of the reference numerals.

Figure 2:
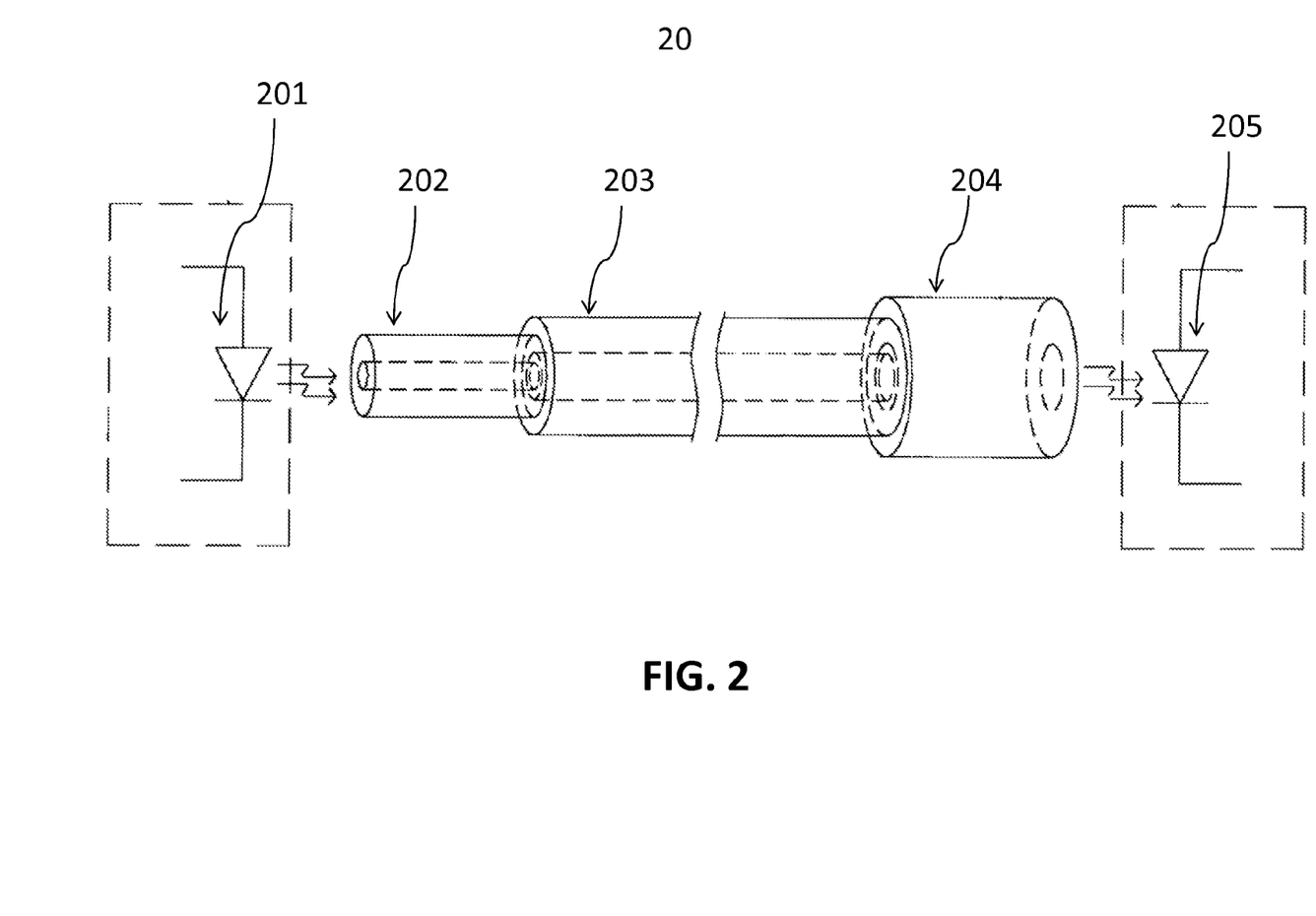
FIG. 2 illustrates a schematic view of a multi-diameter fiber link solution.

In order to simplify the backplane design and eliminate EMI, in an embodiment of the present invention, the optical fiber links and an optical-based backplane are used to replace the electrical wiring system, because optical signals do not generate EMI. However, it is difficult and expensive to use existing fiber solutions (e.g., expensive fiber optic ceramic ferrules) to perform the functions of the line card connector 102 and backplane connector 111 due to the very strict tolerance for the optical connectors. To overcome this problem, a co-pending application Ser. No. 13/067,037 provides a multi-diameter fiber link solution to ease tolerances for the optical connectors. As shown in FIG. 2, the laser diode 201 transfers the electrical signal to an optical signal and feeds the optical signal to the type-1 fiber 202. The optical signal continues to pass to the type-2 fiber 203 and then the type-3 fiber 204. Finally, the optical signal reaches the photo detector 205 and the optical signal is transferred back to an electrical signal. As the diameter of the type-1 fiber 202 is less than the diameter of the type-2 fiber 203 and the diameter of the type-2 fiber 203 is less than the diameter of the type-3 fiber 204, the required alignment between the optical fibers is significantly lower than that of equal-diameter fibers. With a careful choice of the diameters for each fiber type, the alignment interface tolerance between the type-1 fiber 202 and the type-2 fiber 203, and between the type-2 fiber 203 and the type-3 fiber 204 can be large enough to allow the use of low cost materials to make the connectors for the backplane design. A possible selection of fibers could be (but not limited to): type-1 with 50 um/125 um, type-2 with 62.5 um/125 um, and type 3 with 85 um/125 um or type-1 with 50 um/125 um, type-2 with 85 um/125 um, and type-3 with 125 um/140 um. It is possible to transmit data up to 100 Gbps within 1.5 meters. This is good enough for applications in a system backplane design.

Figure 3:
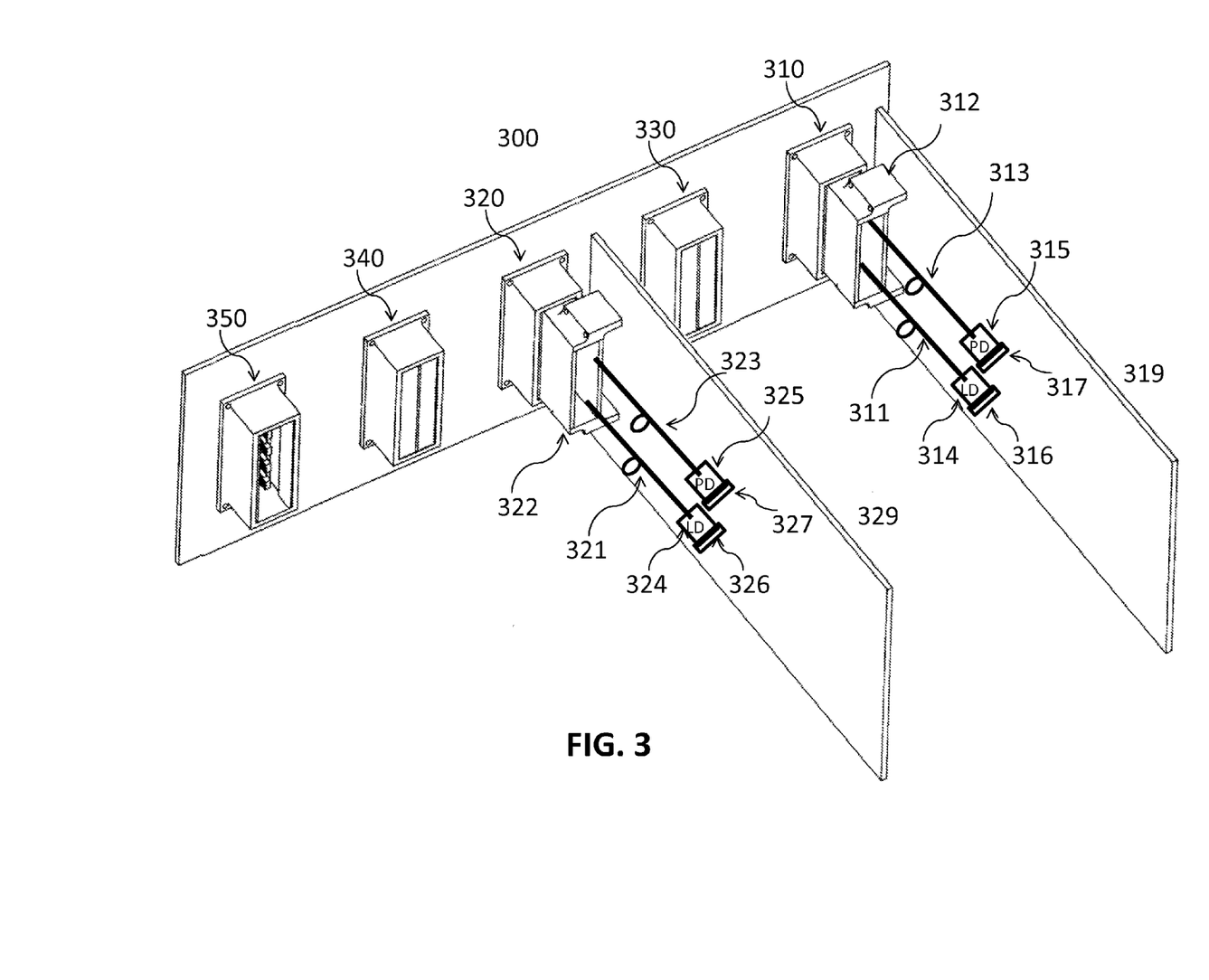
FIG. 3 illustrates a prospective view of an optical fiber-based system backplane solution using a multi-diameter optical fiber link in accordance with an embodiment of the present invention.
Figure 4:
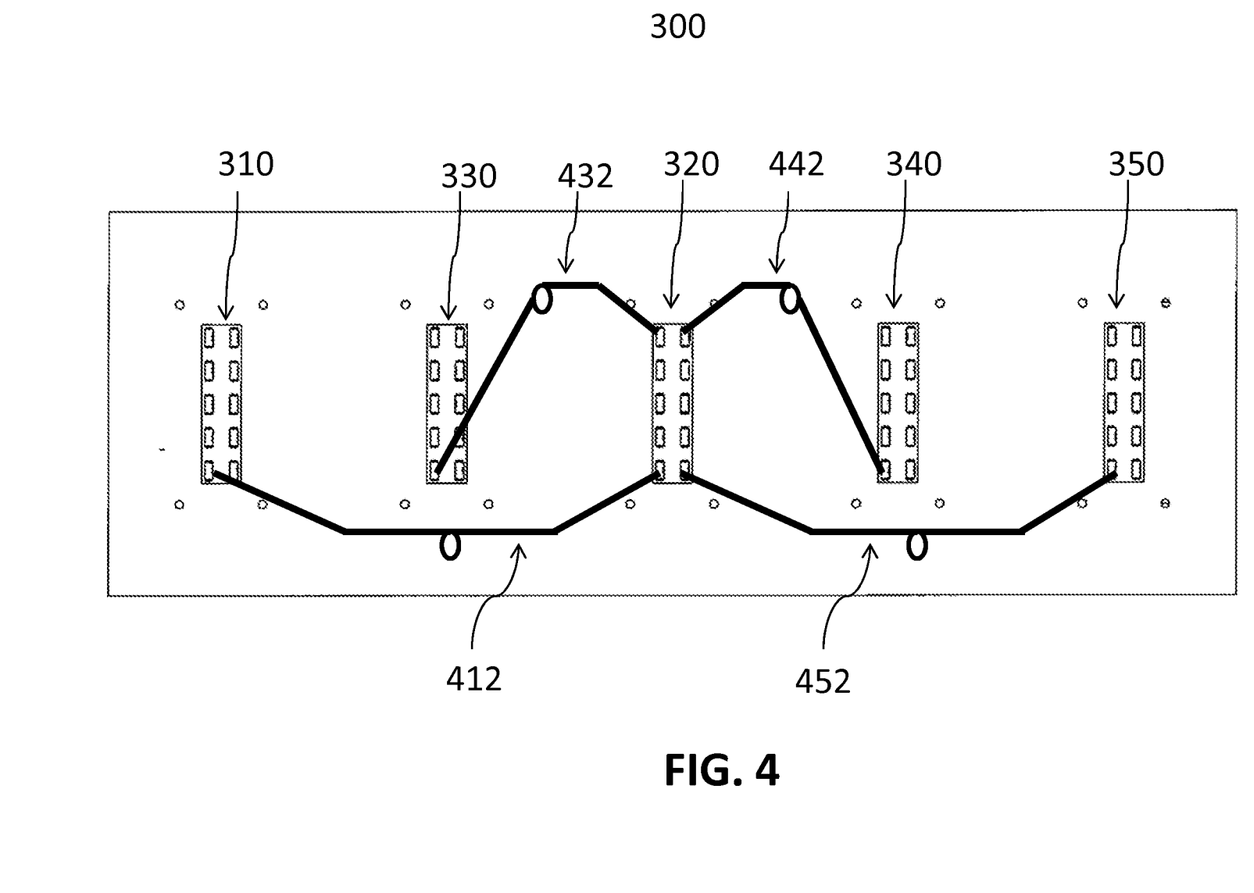
FIG. 4 illustrates a back view of the of the optical fiber-based system backplane solution in FIG. 3.

FIG. 3 illustrates a prospective view of an optical fiber-based system backplane solution using a multi-diameter optical fiber link in accordance with an embodiment of the present invention. In the illustrated embodiment, the electrical signal of the line card module 319 is transmitted through the optical transmitting module socket 316 to the optical transmitting module 314. The laser diode (LD) of the optical transmitting module 314 converts an electrical signal to an optical signal and feeds the optical signal into the type-1 fiber 311. The type-1 fiber 311 is connected to a type-2 fiber (512 in FIG. 5), which is one of the fiber links of the type-2 fiber bundle 412 as shown in FIG. 4, by the line card connector 312 and the backplane connector 310 of the optical fiber-based backplane 300. As shown in FIG. 4, the type-2 fiber bundle 412 is connected to the backplane connector 320. The type-2 fiber (512 in FIG. 5) of the type-2 fiber bundle 412 is connected to the type-3 fiber 323 by the backplane connector 320 and the line card connector 322 of the line card module 329 in FIG. 3. The type-3 fiber 323 is linked to the optical receiving module 325, and the photo detector (PD) of the optical receiving module 325 converts the optical signal to an electrical signal which is transmitted to the line card module 329 through the optical receiving module socket 327. In the reverse direction, the electrical signal of the line card module 329 is transmitted through the optical transmitting module socket 326 to the optical transmitting module 324. The laser diode (LD) of the optical transmitting module 324 converts an electrical signal to an optical signal and feeds the optical signal into the type-1 fiber 321. The type-1 fiber 321 is connected to the type-2 fiber (512 in FIG. 5), which is one of the fiber links of the type-2 fiber bundle 412 as shown in FIG. 4, by the line card connector 322 and the backplane connector 320 of the optical fiber-based backplane 300. As shown in FIG. 4, the type-2 fiber bundle 412 is connected to the backplane connector 310. The type-2 fiber (512 in FIG. 5) of the type-2 fiber bundle 412 is linked to the type-3 fiber 313 by the backplane connector 310 and the line card connector 312 of the line card module 319 in FIG. 3. The type-3 fiber 313 is linked to the optical receiving module 315, and the photo detector (PD) of the optical receiving module 315 converts the optical signal to an electrical signal, which is transmitted to the line card module 319 through the optical receiving module socket 317. The bi-directional connection is done by the above signal flow without the need of using fiber optic ceramic ferrules.

FIG. 4 illustrates a back view of the optical fiber-based system backplane solution in FIG. 3. In this embodiment, the system control module is located at the backplane connector 320. The backplane connector 320 communicates with the other backplane connectors 310, 330, 340, 350. In particular, the backplane connector 320 is linked to the backplane connector 310 by the type-2 fiber bundle 412; the backplane connector 320 is linked to the backplane connector 330 by the type-2 fiber bundle 432; the backplane connector 320 is linked to the backplane connector 340 by the type-2 fiber bundle 442; the backplane connector 320 was linked to the backplane connector 350 by the type-2 fiber bundle 452.

Figure 5:
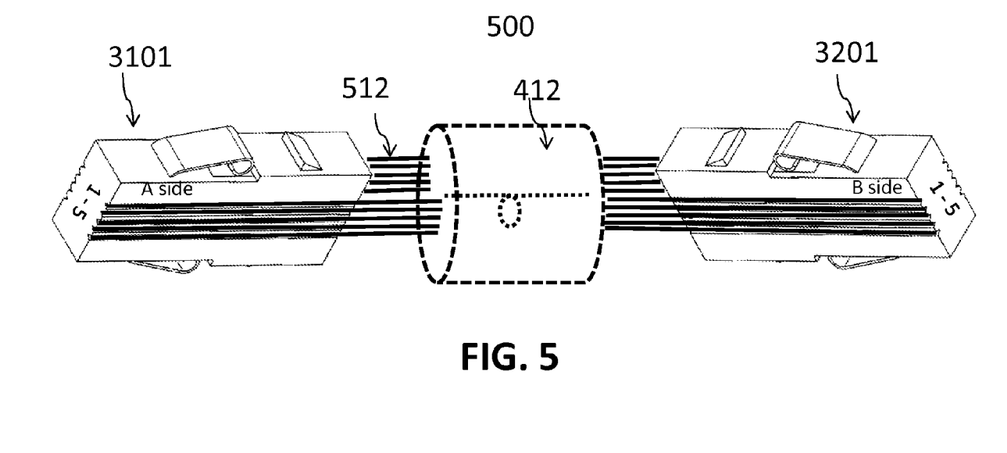
FIG. 5 illustrates how a type-2 fiber bundle links two backplane connectors in accordance with an embodiment of the present invention.

FIG. 5 illustrates how the type-2 fiber bundle 412 links the backplane connectors 310 and 320 in accordance with an embodiment of the present invention. It should be noted that the same arrangement is also used to link any two backplane connectors. In the illustrated embodiment, each backplane connector includes a plurality of fiber holders. For example, as shown in FIG. 9, the backplane connector 310 includes a plurality of fiber holders 3101. Similarly, the backplane connector 320 also includes a plurality of fiber holders 3201. In the illustrated embodiment, each fiber holder 3101/3201 can carry ten (10) type-2 fiber links 512, although the number of the fiber links that can be carried by each fiber holder can be more or less than ten (10). For illustration purpose, ten (10) fibers will be used in the illustrated embodiment. The ten (10) type-2 fiber links 512 are bundled together as the type-2 fiber bundle 412. This type-2 fiber bundle 412 is a basic connection unit between the backplane connectors 310 and 320. In the illustrated embodiment, five (5) type-2 fiber links 512 extending between the fiber holders 3101 and 3201 are installed on the A side of the fiber holder 3101 and the B side of the fiber holder 3201, and another five (5) type2 fiber links 512 extending between the fiber holders 3101 and 3201 are installed on the B side of the fiber holder 3101 and the A side of the fiber holder 3201. The type-2 fiber bundle 412 link up the fiber backplane connectors 310 and 320 as shown in FIG. 4. Similarly, the type-2 fiber bundles 432, 442, 452 respectively link up the fiber backplane connectors 320 and 330, 320 and 340, and 320 and 350, as shown in FIG. 4. Therefore, the structure 500 including the fiber holder 3101, the fiber holder 3201 and the type-2 fiber bundle 412 is a unit structure linking up the fiber backplane connectors 310 and 320.

Figure 6:
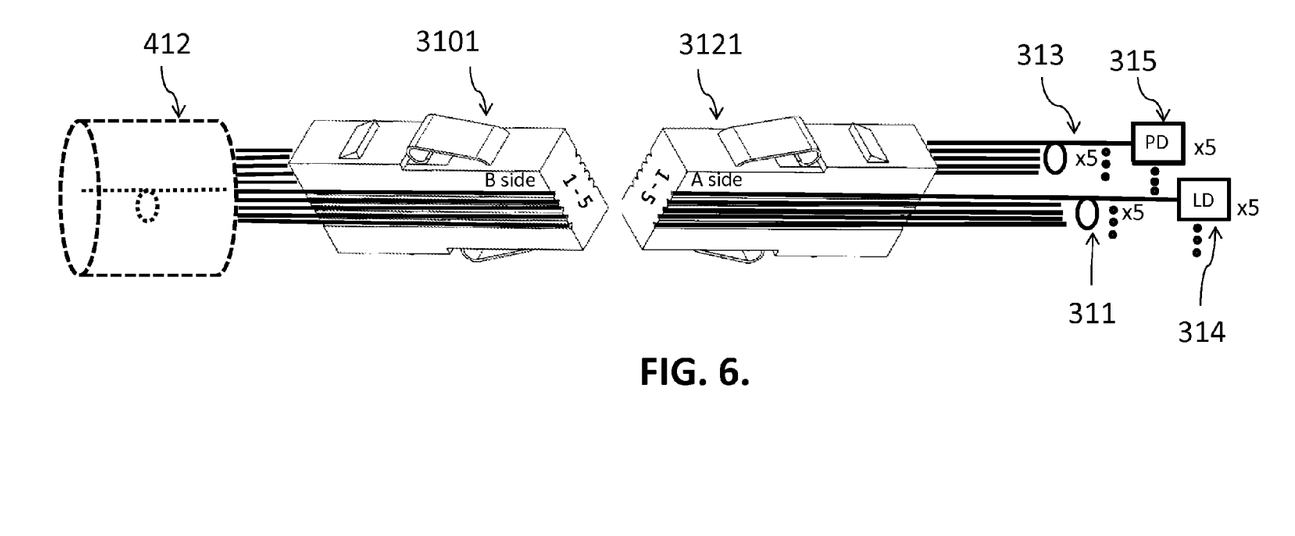
FIG. 6 illustrates how a backplane connector and a line card connector are linked in accordance with an embodiment of the present invention.

FIG. 6 illustrates how the backplane connector 310 and the line card connector 312 are linked in accordance with an embodiment of the present invention. It should be noted that the same arrangement is also used to link any backplane connector and the corresponding line card connector. In the illustrated embodiment, each line card connector includes a plurality of fiber holders. For example, as shown in FIG. 8, the line card connector 312 includes a plurality of fiber holders 3121. As shown in FIG. 6, the fiber holder 3121 has the same design as the fiber holders 3101 and 3201. In the illustrated embodiment, the fiber holder 3121, which carries five (5) type-1 fiber links 311 on its A side and five (5) type-3 fiber links 313 on its B side, could be easily installed to the line card connector 312. When the fiber holders 3101 and 3121 are coincident (i.e., when the A side of the fiber holder 3101 substantially (i.e., within the range of typical manufacturing deviation) aligns with the B side of the fiber holder 3121, and the B side of the fiber holder 3101 substantially (i.e., within the range of typical manufacturing deviation) aligns with the A side of the fiber holder 3121), the five (5) type-1 fibers 311 are respectively connected to the five (5) type-2 fibers 512 of the type-2 fiber bundle 412, and the other five (5) type-2 fibers 512 of the type-2 fiber bundle 412 are respectively connected to the five (5) type-3 fibers 313. In addition, since the ten (10) type-2 fiber 512 extend to the fiber holder 3201 for the backplane connector 320, and the backplane connector 320 are linked to the line card connector 322 in the same manner as shown in FIG. 6, the link in both directions (i.e., type-1 fibers 311→type-2 fibers 412/512→3 type-3 fibers 323, and type-1 fibers 321→type-2 fibers 412/512→type-3 fibers 313) are achieved.

In particular, since the diameter of the type-1 optical fiber is smaller than the diameter of the type-2 optical fiber, when the entire end surface of one end of the type-1 optical fiber 311 held by the A side of the line card fiber holder 3121 directly faces an area within the entire end surface of one end of the type-2 optical fiber held by the B side of the backplane fiber holder 3101, the link between the type-1 optical fiber and the type-2 optical fiber is achieved without the need of using fiber optic ceramic ferrules and any other connectors, thereby allowing optical signals to be transmitted from the type-1 optical fiber held by the A side of the line card fiber holder 3121 to the type-2 optical fiber held by the B side of the backplane fiber holder 3101. Similarly, since the diameter of the type-2 optical fiber is smaller than the diameter of the type-3 optical fiber, when the entire end surface of one end of the type-2 optical fiber by the A side of the backplane fiber holder 3101 directly faces an area within an entire end surface of one end of the type-3 optical fiber 313 held by the B side of the line card fiber holder 3121, the link between the type-2 optical fiber and the type-3 optical fiber is achieved without the need of using fiber optic ceramic ferrules and any other connectors, thereby allowing optical signals to be transmitted from the type-2 optical fiber held by the A side of the backplane fiber holder 3101 to the type-3 optical fiber held by the B side of the line card fiber holder 3121.

Figure 7:
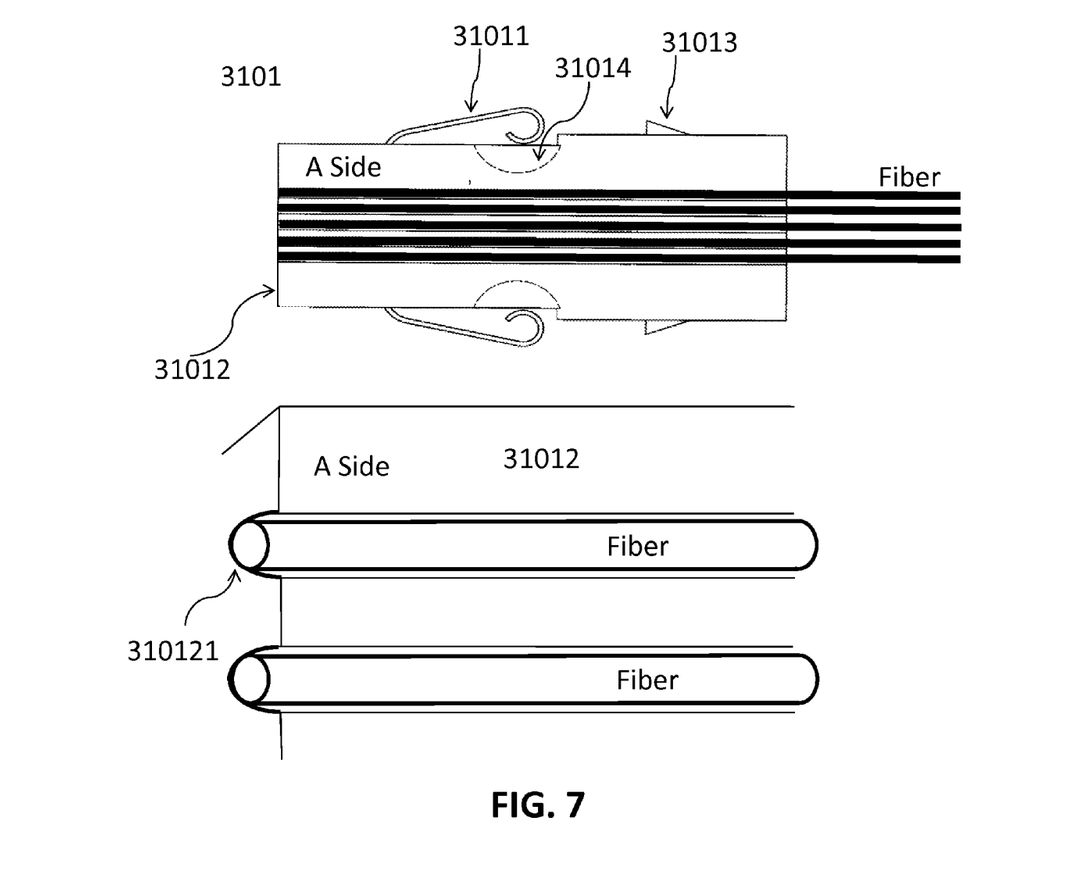
FIG. 7 illustrates a fiber holder in accordance with an embodiment of the present the present invention.

FIG. 7 illustrates a fiber holder in accordance with an embodiment of the present the present invention. Although the fiber holder in FIG. 7 is the fiber holder 3101 for the backplane connector 3101, the same design can also apply to the fiber holders for the other backplane connector or the line card connectors.

As shown in FIG. 7, the fiber holder 3101 for the backplane connector 310 includes a spring 31011, a spring rest hole 31014, a fiber holder stopper 31013, and a fiber holder body 31012. The fiber holder stopper 31013 is designed to hold the fiber holder 3101 when the fiber holder 3101 is plugged into the backplane connector 310. The spring 31011 is designed for two functions: one is to work with the fiber holder stopper 31013 to hold the fiber holder 3101 in the right position when the fiber holder 3101 is plugged into the backplane connector 310, and the other one is to ensure that the two faces of the fiber holders 3101 and 3121 are coincident when assembled. The spring rest hole 31014 is designed to reserve the space for the spring 31011 to recede when the fiber holder 3101 is being plugged into the backplane connector 310. In the illustrated embodiment, the fiber holder body 31012 has 5 U-shape tracks 310121 on each of the A and B sides. The number of U-shape tracks 310121 could be greater or less than 5 on each side. The number of tracks per side can be half the total number of fibers for the fiber holder 3101. The fiber is completely buried inside the fiber holder body 31012 to avoid contact between the fiber and the backplane connector 310 when the fiber holder 3101 is plugged in.

Figures 8A, 8B, 8C:
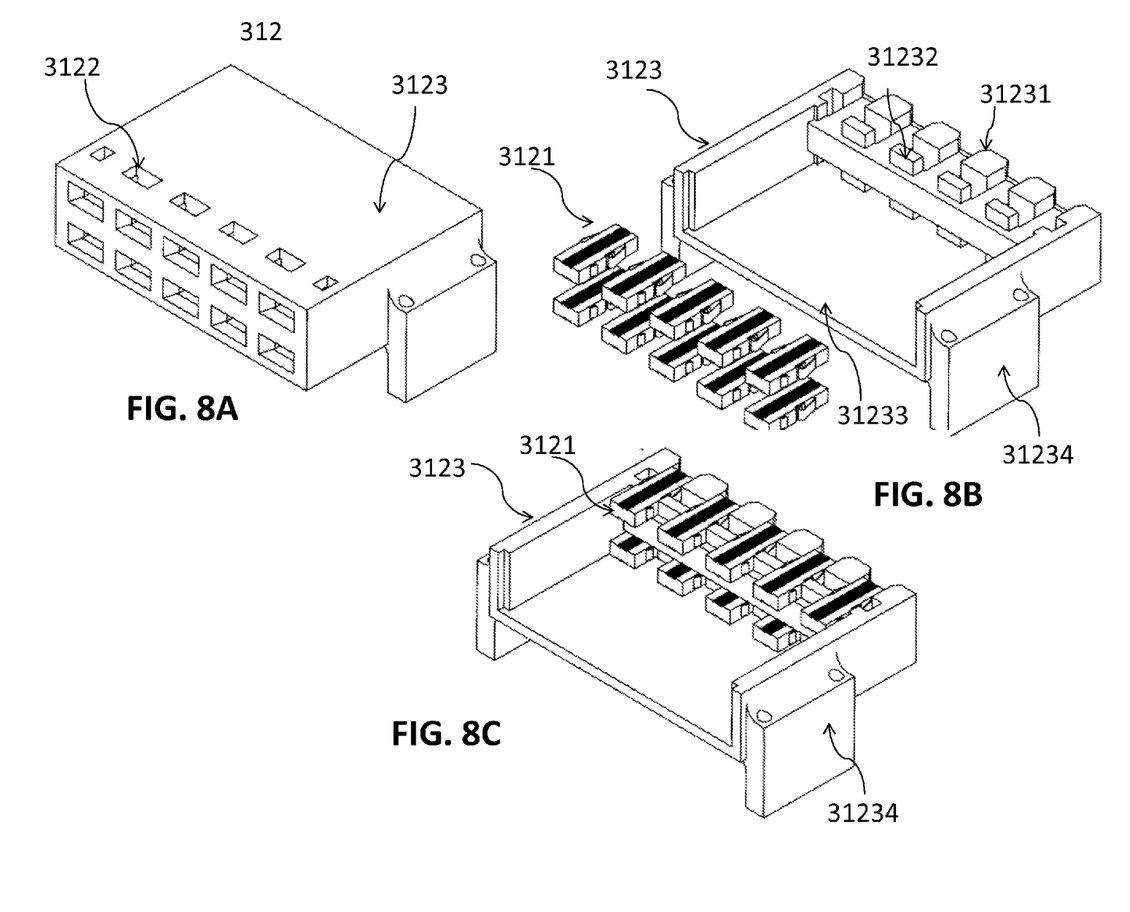
FIGS. 8A-C illustrate a line card connector in accordance with an embodiment of the present invention.

FIGS. 8A-C illustrate a line card connector in accordance with an embodiment of the present invention. Although the line card connector in FIGS. 8A-C is the line card connector 312, the same design can also apply to the other line card connector. As shown in FIGS. 8A-C, the line card connector 312 includes a line card connector body 3123 and a plurality of fiber holder releasing holes 3122. The module releasing holes 3122 are designed to unplug the fiber holder 3121 by compressing the spring 31211 to release the fiber holder 3121 (type-1 and type-3 fiber links are not shown in the fiber holder 3121 for simplification). FIGS. 8B and 8C illustrate the internal structures of the line card connector 312 without showing the top of the line card connector body 3123. As shown in FIG. 8B, the line card connector body 3123 includes a plurality of module match alignment elements 31231, a plurality of module sockets 31232, a fiber holder insertion hole 31233, and a pair of line card connector holders 31234. The module socket 31232 is used to align and hold the fiber holder 3121. The spring (similar to the spring 31211 in FIG. 7) holds the fiber holder 3121 when the fiber holder 3121 is plugged into the line card connector 312. The module match alignment element 31231 is used to align with fiber holder 3101 of the backplane connector 310 and the fiber holder 3121 of the line card connector 312 while the line card connector 312 is inserted to the backplane connector 310. The module match alignment element 31231 has wide chamfered holes which are designed to have some tolerance to guide the fiber holder 3101 of the backplane connector 310 during assembly. The springs on both fiber holder 3101 of the backplane connector 311 and the fiber holder 3121 of the line card connector 312 are designed to ensure both fiber holders 3101 and 3121 are coincident by applying a force normal to the mated surface. Combined with springs (similar to the spring 31211 in FIG. 7) and the module match alignment element 31231 functions, the two fiber holders 3101 and 3121 are substantially (i.e., within the range of typical manufacturing deviation) aligned, and the fibers, i.e., type-1 fiber 311 and type-2 fiber 512, and type-2 fiber 512 and type-3 fiber 313, on each side of fiber holders 3101 and 3121 can completely match with each other. The optical signal can be transmitted through the fibers with minimum signal loss.

Figures 9A, 9B:
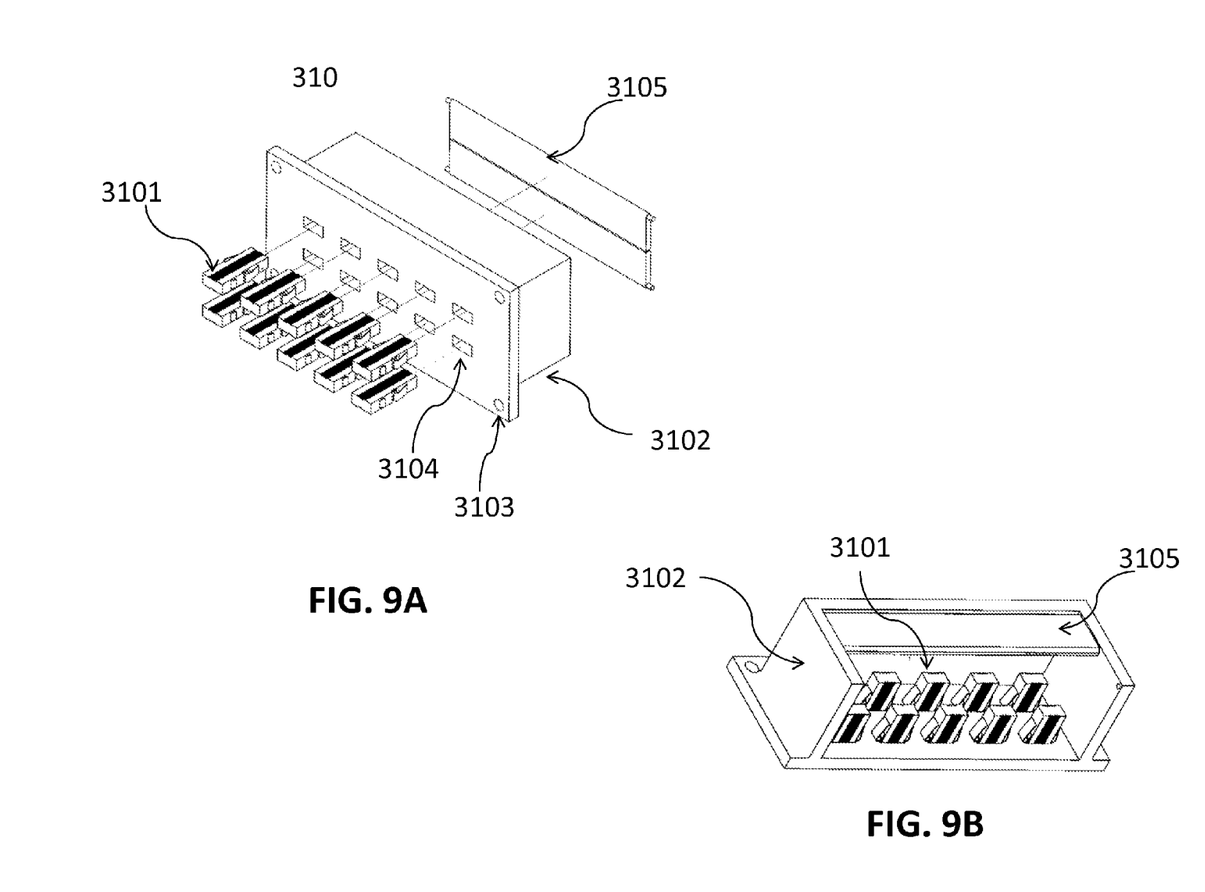
FIGS. 9A-B illustrate a backplane connector in accordance with an embodiment of the present invention.

FIGS. 9A-B illustrate a backplane connector in accordance with an embodiment of the present invention. Although the backplane connector in FIGS. 9A-B is the backplane connector 310, the same design can also apply to the backplane connectors. In addition, FIG. 9B illustrates a back view of the backplane connector 310 without showing the bottom of the backplane connector 310 and the entire dust protecting 3105. The backplane connector 310 includes a dust protecting door 3105, a backplane connector body 3102, a backplane connector holder 3103, and a plurality of backplane connector module socket 3104. The dust protecting door 3105 is designed to avoid any dust pollution to the fiber face of the fiber holder 3101 when the line card connector 312 is not connected. The door 3105 will be opened when the line card module 319 is inserted to the backplane connector 310. The backplane connector body 3102 is designed to substantially (i.e., within the range of typical manufacturing deviation) align with the line card connector 312. The backplane connector holder 3103 is used to secure the backplane connector 310 to the optical fiber-based backplane 300. The backplane connector module socket 3104 is designed to substantially (i.e., within the range of typical manufacturing deviation) align the fiber holder 3101. It is the same function as the module socket 31232 of the line card connector 312. It is easy to unplug the fiber holder for repair by pressing on the spring 31011.

In addition, as can be seen in FIGS. 3, 7 and 9B, the type-2 optical fibers held on the A side of the corresponding backplane fiber holder and the type-2 optical fibers held on the B side of the corresponding pass through the backplane 300 along with the corresponding backplane fiber holder. In particular, the type-2 optical fibers held by the tracks on the A side of the corresponding backplane fiber holder and the type-2 optical fibers held by the tracks on the B side of the corresponding backplane fiber holder pass through the backplane 300 via the tracks on the A side of the corresponding backplane fiber holder and on the tracks on the B side of the corresponding backplane fiber holder, respectively. This will eliminate the need to provide an additional hole on the backplane 300 for the optical fibers to pass therethrough.

By using the multi-diameter fiber link fiber backplane solution of the present invention, the optical fiber-based backplane can carry the 10 Gbps to 100 Gbps data rate per fiber link with very low cost line card connector and backplane connector. Also, there is no EMI problem for the optical fiber-based backplane because the complete data path is linked by optical fibers transmitting optical signals. This solution can also synchronize all the signals with the same delay due to equal fiber lengths.

The present invention also provides modularized optical fiber holders and optical module sockets. Each modularized optical fiber holder carries multiple fiber links for a desired transfer rate. The optical module socket can carry a flexible number of the modularized fiber holders. It is easy to install the modularized fiber holders to the optical module socket of the backplane connector and the line card connector. By using the multi-diameter fiber link of the present invention, the larger optical tolerance of both modularized fiber holder and optical module socket make it feasible to manufacture the fiber holder, line card connector and backplane connector using a relatively low-precision and low cost plastic injection molding process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi-diameter optical fiber link system, comprising:
a backplane;
a plurality of backplane connectors fixed on the backplane, each of the backplane connectors including:
at least one backplane fiber holder having a first side and a second side opposite to the first side, each of the first side and the second side of the at least one backplane fiber holder holding at least one type-2 optical fiber; and
a plurality of line card connectors, each of the line card connectors being inserted into a corresponding one of the backplane connectors, each of the line card connectors including:
at least one line card fiber holder having a first side and a second side opposite to the first side, the first side of the at least one line card fiber holder holding at least one type-1 optical fiber, the second side of the at least one line card fiber holder holding at least one type-3 optical fiber,
wherein the at least one type-1 optical fiber, the at least one type-2 optical fiber and the at least one type-3 optical fiber have mutually different diameters, and
wherein the at least one line card fiber holder of one of the line card connectors is substantially aligned with the at least one backplane fiber holder of the corresponding one of the backplane connectors, such that one end of the at least one type-1 optical fiber held by the first side of the at least one line card fiber holder faces one end of the at least one type-2 optical fiber held by the first side of the at least one backplane fiber holder, thereby allowing optical signals to be transmitted from the at least one type-1 optical fiber to the at least one type-2 optical fiber held by the first side of the at least one backplane fiber holder, and one end of the at least one type-3 optical fiber held by the second side of the at least one line card fiber holder faces one end of the at least one type-3 optical fiber held by the second side of the at least one backplane fiber holder, thereby allowing optical signals to be transmitted from the at least one type-2 optical fiber held by the second side of the at least one backplane fiber holder to the at least one type-3 optical fiber.

2. The multi-diameter optical fiber link system of claim 1, wherein the diameter of the at least one type-1 optical fiber is smaller than the diameter of the at least one type-2 optical fiber, such that an entire end surface of the one end of the at least one type-1 optical fiber directly faces an area within an entire end surface of the one end of the at least one type-2 optical fiber held by the first side of the at least one backplane fiber holder, and the diameter of the at least one type-2 optical fiber is smaller than the diameter of the at least one type-3 optical fiber such that an entire end surface of the one end of the at least one type-2 optical fiber by the second side of the at least one backplane fiber holder directly faces an area within an entire end surface of the one end of the at least one type-3 optical fiber.

3. The multi-diameter optical fiber link system of claim 1, wherein each of the line card connectors is fixed on a corresponding one of a plurality of line cards.

4. The multi-diameter optical fiber link system of claim 1, wherein the other end of the at least one type-1 optical fiber directly faces a laser diode for receiving the optical signals from the laser diode, and the other end of the at least one type-3 optical fiber directly faces a photo diode for transmitting the optical signals to the photo diode.

5. The multi-diameter optical fiber link system of claim 1, wherein the at least one type-2 optical fiber held on the first side of the at least one backplane fiber holder and the at least one type-2 optical fiber held on the second side of the at least one backplane fiber holder pass through the backplane along with the at least one backplane fiber holder.

6. The multi-diameter optical fiber link system of claim 1, wherein the first side of the at least one backplane fiber holder has at least one first track holding the at least one type-2 optical fiber thereon, and the second side of the at least one backplane fiber holder has at least one second track holding the at least one type-2 optical fiber thereon.

7. The multi-diameter optical fiber link system of claim 1, wherein the first side of the at least one line card fiber holder has at least one first track holding the at least one type-1 optical fiber thereon, and the second side of the at least one line card fiber has at least one second track holding the at least one type-3 optical fiber thereon.

8. The multi-diameter optical fiber link system of claim 1, wherein the at least one type-2 optical fiber held by the first side of the at least one backplane fiber holder of a first one of the backplane connectors extends to and is held by the second side of the at least one backplane fiber holder of a second one of the backplane connectors, and the at least one type-2 optical fiber held by the second side of the at least one backplane fiber holder of the first one of the backplane connectors extends to and is held by the second side of the at least one backplane fiber holder of the second one of the backplane connectors.

9. The multi-diameter optical fiber link system of claim 1, wherein each of the backplane connectors includes:
a backplane connector body with at least one backplane connector module socket on a rear side thereof, the at least one backplane fiber holder being inserted through the at least one backplane connector module socket; and
a dust protecting door on a front side of the backplane connector body, the dust protecting door being open by a corresponding one of the line card connectors inserted therethrough.

10. The multi-diameter optical fiber link system of claim 1, wherein the at least one line card fiber holder further includes:
a fiber holder stopper configured to prevent the at least one line card fiber holder from being further inserted into a corresponding one of the line card connectors;
a spring configured to prevent the at least one line card fiber holder from being removed from the corresponding one of the line card connectors; and
a spring rest hole configured to accommodate a flexible movement of the spring so as to release the at least one line card fiber holder from the corresponding one of the line card connectors.

11. The multi-diameter optical fiber link system of claim 10, wherein each of the line card connector includes a line card connector body, the line card connector body including:
at least one line card connector module socket on a rear side thereof, the spring of the at least one line card fiber holder being inserted into the at least one line card connector module socket, thereby preventing the at least one line card fiber holder from being removed from the at least one line card connector module socket;
at least one line card fiber holder releasing hole facing the at least one line card connector module socket and the spring rest hole, such that the spring is accessible and pressable to the spring rest hole through the at least one line card fiber holder releasing hole; and
at least one module match alignment element configured to alight the at least one backplane fiber holder of one of the backplane connectors with the at least one line card fiber holder of a corresponding one of the line card connectors that is inserted to the one of the backplane connectors.

12. A multi-diameter optical fiber link system, comprising:
a backplane;
a plurality of backplane connectors fixed on the backplane, each of the backplane connectors including:
at least one backplane fiber holder having a first side and a second side opposite to the first side, each of the first side and the second side of the at least one backplane fiber holder holding at least one type-2 optical fiber; and
a plurality of line card connectors, each of the line card connectors being inserted into a corresponding one of the backplane connectors, each of the line card connectors including:
at least one line card fiber holder having a first side and a second side opposite to the first side, the first side of the at least one line card fiber holder holding at least one type-1 optical fiber, the second side of the at least one line card fiber holder holding at least one type-3 optical fiber,
wherein the diameter of the at least one type-1 optical fiber is smaller than the diameter of the at least one type-2 optical fiber, and the diameter of the at least one type-2 optical fiber is smaller than the diameter of the at least one type-3 optical fiber, and
wherein the at least one line card fiber holder of one of the line card connectors is substantially aligned with the at least one backplane fiber holder of the corresponding one of the backplane connectors, such that an entire end surface of one end of the at least one type-1 optical fiber directly faces an area within an entire end surface of one end of the at least one type-2 optical fiber held by the first side of the at least one backplane fiber holder, thereby allowing optical signals to be transmitted from the at least one type-1 optical fiber to the at least one type-2 optical fiber held by the first side of the at least one backplane fiber holder, and an entire end surface of one end of the at least one type-2 optical fiber by the second side of the at least one backplane fiber holder directly faces an area within an entire end surface of one end of the at least one type-3 optical fiber, thereby allowing optical signals to be transmitted from the at least one type-2 optical fiber held by the second side of the at least one backplane fiber holder to the at least one type-3 optical fiber.

13. The multi-diameter optical fiber link system of claim 11, wherein each of the line card connectors is fixed on a corresponding one of a plurality of line cards.

14. The multi-diameter optical fiber link system of claim 11, wherein the other end of the at least one type-1 optical fiber directly faces a laser diode for receiving the optical signals from the laser diode, and the other end of the at least one type-3 optical fiber directly faces a photo diode for transmitting the optical signals to the photo diode.

15. The multi-diameter optical fiber link system of claim 11, wherein the first side of the at least one backplane fiber holder has at least one first track holding the at least one type-2 optical fiber thereon, the second side of the at least one backplane fiber holder has at least one second track holding the at least one type-2 optical fiber thereon, and the at least one type-2 optical fiber held by the at least one first track and the at least one type-2 optical fiber held by at least one first track pass through the backplane via the at least one first track and the at least one second track, respectively.

16. The multi-diameter optical fiber link system of claim 11, wherein the first side of the at least one line card fiber holder has at least one first track holding the at least one type-1 optical fiber thereon, and the second side of the at least one line card fiber has at least one second track holding the at least one type-3 optical fiber thereon.

17. The multi-diameter optical fiber link system of claim 11, wherein the at least one type-2 optical fiber held by the first side of the at least one backplane fiber holder of a first one of the backplane connectors extends to and is held by the second side of the at least one backplane fiber holder of a second one of the backplane connectors, and the at least one type-2 optical fiber held by the second side of the at least one backplane fiber holder of the first one of the backplane connectors extends to and is held by the second side of the at least one backplane fiber holder of the second one of the backplane connectors.

18. The multi-diameter optical fiber link system of claim 11, wherein each of the backplane connectors includes:
 a backplane connector body with at least one backplane connector module socket on a rear side thereof, the at least one backplane fiber holder being inserted through the at least one backplane connector module socket; and
 a dust protecting door on a front side of the backplane connector body, the dust protecting door being open by a corresponding one of the line card connectors inserted therethrough.

19. The multi-diameter optical fiber link system of claim 11, wherein the at least one line card fiber holder further includes:
 a fiber holder stopper configured to prevent the at least one line card fiber holder from being further inserted into a corresponding one of the line card connectors;
 a spring configured to prevent the at least one line card fiber holder from being removed from the corresponding one of the line card connectors; and
 a spring rest hole configured to accommodate a flexible movement of the spring so as to release the at least one line card fiber holder from the corresponding one of the line card connectors.

20. The multi-diameter optical fiber link system of claim 19, wherein each of the line card connector includes a line card connector body, the line card connector body including:
 at least one line card connector module socket on a rear side thereof, the spring of the at least one line card fiber holder being inserted into the at least one line card connector module socket, thereby preventing the at least one line card fiber holder from being removed from the at least one line card connector module socket;
 at least one line card fiber holder releasing hole facing the at least one line card connector module socket and the spring rest hole, such that the spring is accessible and pressable to the spring rest hole through the at least one line card fiber holder releasing hole; and
 at least one module match alignment element configured to alight the at least one backplane fiber holder of one of the backplane connectors with the at least one line card fiber holder of a corresponding one of the line card connectors that is inserted to the one of the backplane connectors.

\* \* \* \* \*